L. A. THOMPSON.
MALTED MILK CONFECTION.
APPLICATION FILED FEB. 15, 1919.

1,434,667.

Patented Nov. 7, 1922.

WITNESSES.

INVENTOR.
Livingston A. Thompson
By R. S. Caldwell
ATTORNEY.

Patented Nov. 7, 1922.

1,434,667

UNITED STATES PATENT OFFICE.

LIVINGSTON A. THOMPSON, OF WAUKESHA, WISCONSIN.

MALTED-MILK CONFECTION.

Application filed February 15, 1919. Serial No. 277,272.

*To all whom it may concern:*

Be it known that I, LIVINGSTON A. THOMPSON, a citizen of the United States, and resident of Waukesha, in the county of Waukesha and State of Wisconsin, have invented new and useful Improvements in Malted-Milk Confections, of which the following is a description, reference being had to the accompanying drawings, which are a part of this specification.

This invention has for its object to provide a candy or confection of malted milk in its foraminous state as it is taken from the vacuum pan but cut into convenient sizes and shapes and having embodied in it as a constituent part thereof a sufficient amount of chocolate or similar non-hygroscopic material to protect it from moisture.

In my Letters Patent No. 1,127,114, dated February 2, 1915, I have disclosed a somewhat similar malted milk product protected from moisture by means of a chocolate coating surrounding it, but the present invention has for its object to dispense with the necessity for dipping the body in chocolate by incorporating chocolate in the malted milk before the latter is dried, so as to form a homogeneous mass therewith, the chocolate being added in sufficient quantity to protect the malted milk from the action of moisture in the air.

With the above and other objects in view the invention consists in the chocolate malted milk confection as herein claimed and all equivalents.

Figure 1:
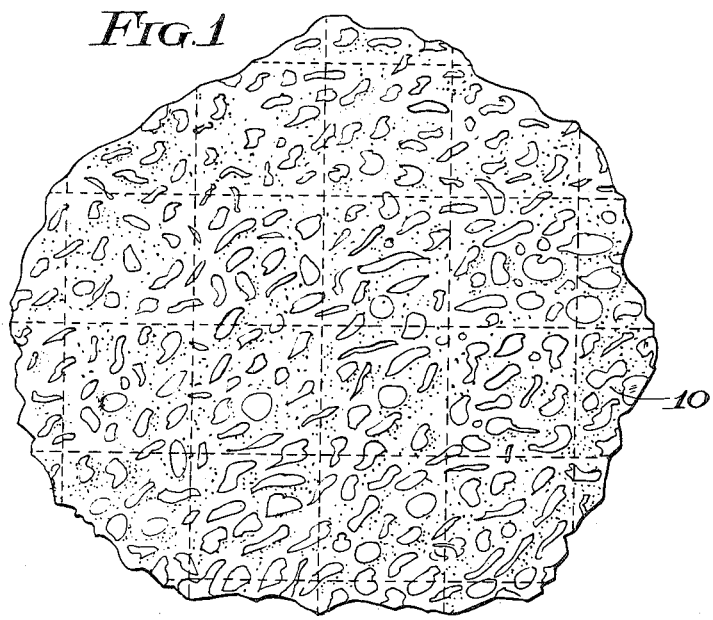
Figure 2:
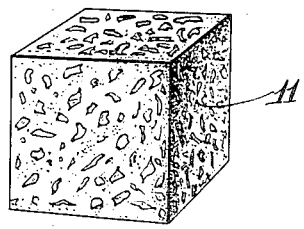

Referring to the accompanying drawings, in which like characters of reference indicate the same parts in the different views:

Fig. 1 is a view of a rough piece of malted milk with chocolate incorporated as it is taken from the evaporating pan, the dotted lines therethrough showing the lines of cut to which it is subjected in cutting it into cubes; and, Fig. 2 is a perspective view of one of the cubes cut therefrom.

In these drawings 10 indicates the rough piece of malted milk as it is broken from the cake formed in the vacuum pan. The product in this state is honeycombed, with large and small openings, resembling a sponge or a piece of coke. The rough piece of malted milk is sawed into blocks or cubes 11 without crushing or disturbing the naturally porous state thereof. The malted milk, before it is dried in the vacuum pan, has thoroughly incorporated with it a quantity of chocolate or cocoa in a powdered state. The chocolate or cocoa may form approximately 10% by weight of the mixture and is so thoroughly mixed with the malted milk as to form a homogeneous mass. A similar quantity of sugar may also be added, though it is not necessary to the moisture proof property produced by the presence of chocolate or cocoa. This property is desirable, for malted milk without it is very soon affected by moisture when exposed to the air, but with the protection afforded by the chocolate or cocoa content malted milk will keep in its natural state for a much longer time even though exposed to the air.

The block form of the malted milk with the air spaces throughout, not only renders it more easily crushed in the mouth, but enables the saliva to come in contact with greater areas of thin surfaces so as to more quickly and thoroughly dissolve the malted milk and thus greatly increase its strength of flavor and enable the flavor of the malted milk and chocolate to be blended instead of acting separately on the sense of taste. Inasmuch as cocoa may be used in the same manner as chocolate for the purpose of this invention, the use of the term chocolate is intended to include it.

What I claim as new and desire to secure by Letters Patent is:

1. As an article of food, a confection consisting of a foraminous body of malted milk having chocolate embodied therein for rendering it moisture-proof.

2. The method of producing a confection as an article of food, consisting in thoroughly mixing with malted milk approximately 10% of chocolate and then drying in a vacuum pan and cutting the cake of chocolate and malted milk as it is taken from the vacuum pan into blocks without crushing or disturbing its foraminous state.

In testimony whereof, I affix my signature in presence of two witnesses.

LIVINGSTON A. THOMPSON.

Witnesses:
R. S. CALDWELL,
H. D. CHASE.